United States Patent
Sueishi

(10) Patent No.: US 8,156,976 B2
(45) Date of Patent: Apr. 17, 2012

(54) OFF-ROAD TIRE FOR MOTORCYCLE

(75) Inventor: Makoto Sueishi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1064 days.

(21) Appl. No.: 12/076,534

(22) Filed: Mar. 19, 2008

(65) Prior Publication Data
US 2008/0245457 A1    Oct. 9, 2008

(30) Foreign Application Priority Data
Apr. 4, 2007 (JP) ................................. 2007-098647

(51) Int. Cl.
*B60C 11/01* (2006.01)
*B60C 11/11* (2006.01)

(52) U.S. Cl. ......... 152/209.11; 152/209.12; 152/209.15; 152/209.16; 152/902

(58) Field of Classification Search ............. 152/209.11, 152/209.12, 209.15, 209.16, 902
See application file for complete search history.

(56) References Cited

U.S. PATENT DOCUMENTS

| | | | | |
|---|---|---|---|---|
| 3,842,879 A | * | 10/1974 | Mills et al. | 152/209.11 |
| 4,112,994 A | * | 9/1978 | Mills et al. | 152/209.11 |
| 5,085,259 A | * | 2/1992 | Goergen et al. | 152/209.18 |
| 6,530,405 B1 | * | 3/2003 | Brown et al. | 152/209.16 |

FOREIGN PATENT DOCUMENTS

| | | | |
|---|---|---|---|
| AU | 37769/78 | * | 1/1980 |
| GB | 2 005 200 A | | 4/1979 |
| JP | 2-45205 A | | 2/1990 |
| JP | 2-74405 | * | 3/1990 |
| JP | 2-225102 A | | 9/1990 |
| JP | 3-204305 A | | 9/1991 |
| JP | 2608113 | * | 5/1997 |

* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

An off-road tire for motorcycle comprises a tread portion provided with a plurality of blocks including an axially outmost shoulder block, a pair of sidewall portions, and a pair of bead portions, the shoulder block comprising a tread face with an axially outer edge corresponding to a tread edge and a lateral face extending from the tread edge to an radially inner edge located on the sidewall portion, the lateral face with a swelling portion swelling axially outside of the tire than a reference line which connects the tread edge and the radially inner edge, in a cross section including a tire axis, and the radial height of the radially inner edge of the lateral face from the bead base line being in a range of from 30 to 50% of the tire section height.

14 Claims, 7 Drawing Sheets

OFF-ROAD TIRE FOR MOTORCYCLE

BACKGROUND OF THE INVENTION

1. Field of the Invention

The present invention relates to an off-road tire for motorcycle in which a plurality of blocks are disposed on a treat portion.

2. Description of the Related Art

As shown in FIG. 7, in an off-road tire for motorcycle in which a plurality of blocks (b) are disposed on a tread portion (a), in order to enhance the cornering performance on the off-road, it is desired that an axially inner block edge (bie) of a shoulder block b1 is provided axially outward of the tire. This is because that the edge effect of the inner block edge (bie) largely contributes to the lateral grip performance at the time of cornering. As the inner block edge (bie) of the shoulder block (b) is provided more axially outward of the tire, the lateral edge effect is more enhanced, and even when a tire is banked at a larger camber angle, the lateral slip can be suppressed and the cornering speed can be increased.

However, when the shoulder block (b1) is provided outward in the axial direction of the tire, the tread width (tire width) is naturally increased. As a result, the running performance when running on the off-road is deteriorated, and interference between the tire and a swing arm which supports the tire through a rim, and/or between the tire and driving chain may happen. Also, when the inner block edge (bie) of the shoulder block b1 is shifted outward in the axial direction of the tire while maintaining the tread width, there is a problem that the block width of the shoulder block b1 is reduced and it causes chipping and/or damage to the shoulder block.

SUMMARY OF THE INVENTION

Therefore, it is an object of the present invention to provide a off-road tire for motorcycle with a swelling portion provided on the lateral face of the shoulder block, it is possible to improve the strength of the shoulder block without increasing the tread width. Also, it is possible to shift the axially inner edge of the tread face of the shoulder block as outward as possible in the axial direction of the tire without reducing the block strength.

According to the present invention, an off-road tire for motorcycle comprises a tread portion provided with a plurality of blocks including an axially outmost shoulder block, a pair of sidewall portions, and a pair of bead portions, the shoulder block comprising a tread face with an axially outer edge corresponding to a tread edge and a lateral face extending from the tread edge to an radially inner edge located on the sidewall portion, the lateral face with a swelling portion swelling axially outside of the tire than a reference line which connects the tread edge and the radially inner edge, in a cross section including a tire axis, and the radial height of the radially inner edge of the lateral face from the bead base line being in a range of from 30 to 50% of the tire section height.

According to the present invention, as described above, the lateral face of the shoulder block is provided with a swelling portion which swells outward in the axial direction of the tire than the reference line. As compared with a conventional tire in which the lateral face extends along the reference line or the lateral face extends inward in the axial direction of the tire than the reference line, the swelling portion can improve the strength of the shoulder block without changing the position of the tread edge. That is, in the present invention, it is possible to enhance the block strength of the shoulder block without increasing the tread width. In other words, it is possible to provide the axially inner edge of the tread face as outward as possible in the axial direction of the tire while keeping the strength of the shoulder block. Accordingly, the off-road tire for motorcycle according to the present invention can enhance the lateral grip performance on off-road and can also enhance the cornering performance without causing interference between the tire and the swing arm and/or the driving chain, and without generating damage such as chip of block.

In the lateral face of the shoulder block, the radial height H1 of the radially inner edge from the bead base line is not less than 30% of the tire section height H0. Thus, it is possible to suppress the deterioration of the impact absorbing performance and the riding comfort caused by the swelling portion.

DETAILED DESCRIPTION OF THE PREFERRED EMBODIMENTS

Figure 1:
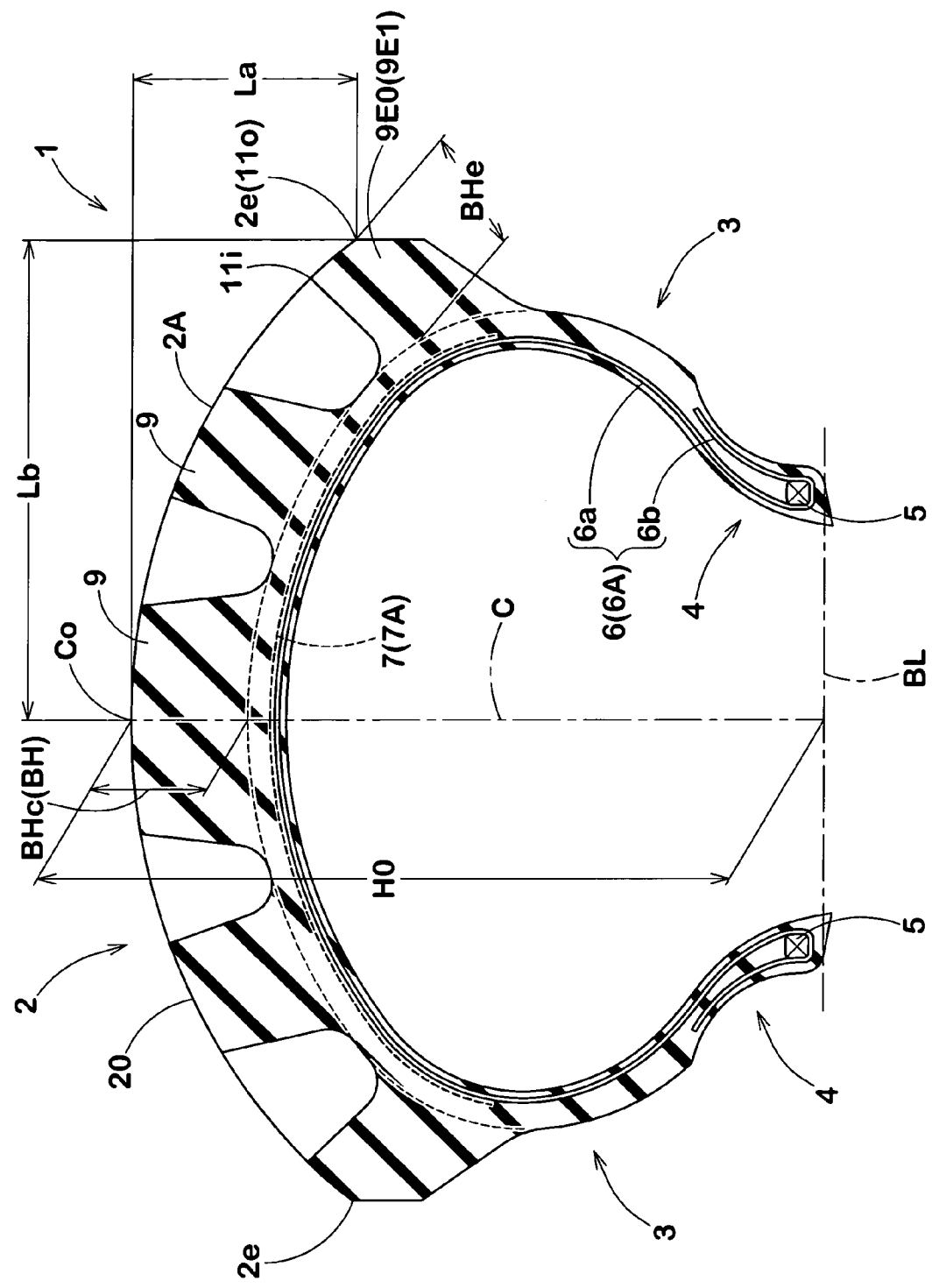
FIG. 1 is a cross sectional view showing an embodiment of an off-road tire for motorcycle of the invention.

Embodiments of the present invention will now be described in detail in conjunction with accompanying drawings.

At first, in the specification, the "dimensions" of respective parts or portions of a tire denote those measured in a normal state, unless otherwise noted. The term "normal state" denotes a normally-inflated unloaded state of a tire in which the tire is mounted on a standard wheel rim and inflated to a standard pressure, but is not loaded.

The standard wheel rim is a wheel rim officially approved for the tire by standard organization, i.e. JATMA (Japan and Asia), T&RA (North America), ETRTO (Europe), STRO (Scandinavia) and the like. The standard pressure is the maximum air pressure for the tire specified by the same organization in the Air-pressure Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like.

According to the present invention, off-road tire 1 for motorcycle is a pneumatic tire designed to be used in motocross races, or the like, and comprises a tread portion 2 provided with a plurality of blocks 9, a pair of sidewall portions 3, a pair of bead portions 4 with a bead core 5 therein, a carcass 6 extending between the bead portions 4, and a tread reinforcing cord layer 7 disposed radially outside the carcass 6.

In a cross section including the tire axis, the tread portion 2 has the tread profile 2A with a relatively small radius which corresponds to a imaginary arc through each tread face 20 of the blocks 9. As for the preferred tread profile 2A, the radial height La from the tire equator point Co intersecting with the tire equator C to the tread edge $2e$ is in a range of from 30 to 40 mm, and the ratio La/Lb of the radial height La to the axial length Lb from the tire equator point Co to the tread edge $2e$ is in a range of from 0.35 to 0.75. Preferably, the maximum tire section width occurs between the tread edges $2e$, namely, the tread width equals to the maximum tire section width.

The carcass 6 is composed of a rubberized ply 6A of organic fiber cords extending between the bead portions 4 and the edges $6b$ thereof are turned up around the bead cores 5 to be secured thereto. As for the carcass 6, a bias structure which includes carcass cords being inclined at angle of from 35 to 60 degrees with respect to the tire equator C, or a radial structure which includes carcass cords being inclined at angle of from 75 to 90 degrees with respect to the tire equator C can be employed.

The tread reinforcing cord layer 7 is composed of two rubberized plies 7A of organic fiber cords which is inclined at angle of from 20 to 60 degrees with respect to the tire equator C.

Figure 2:
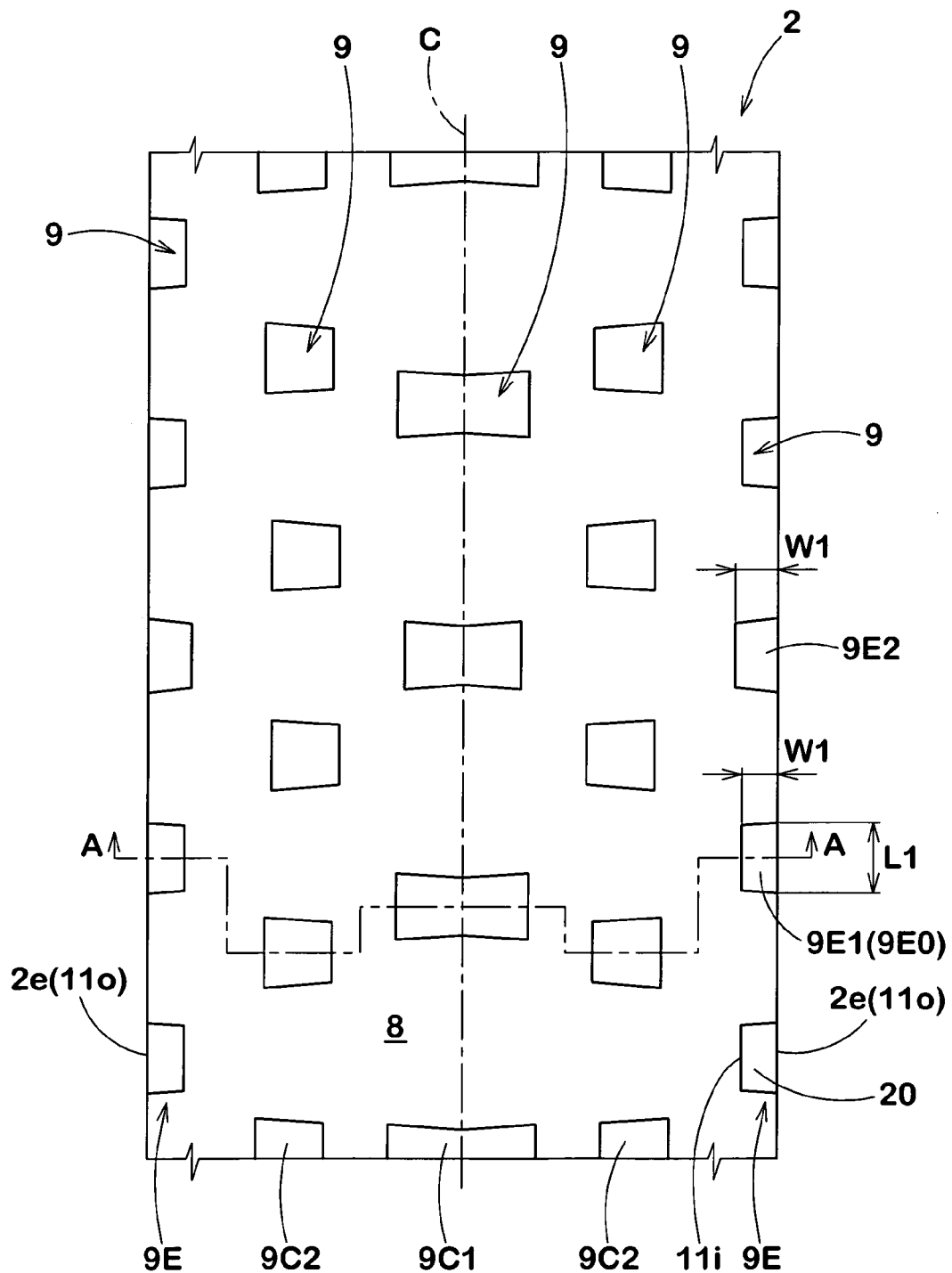
FIG. 2 is a development view showing a tread pattern of the tire.

As shown in FIG. 2, the tread portion 2 is provided with a block pattern defined by a plurality of blocks 9, namely there is no rib, and a sea area 8 (corresponding to "grooved area" of a street tire) is formed around the blocks 9.

As apparent from FIG. 2, the blocks 9 are provided sparsely. Such a sparsely distributed disposition of blocks 9 is useful for securing a high traction force since the ground contact pressure of respective blocks 9 is increased to increase the amount of sticking into a soft terrain such as mud of blocks 9. Further, since a wide sea area 8 is formed between the blocks 9, mud dischargeability is high and clogging of grooves can be prevented.

The sparsely distributed disposition of blocks 9 can be quantitatively defined by a land ratio Sb/S of the total surface area Sb of tread face 20 facing radially outwardly of blocks 9 to the whole surface area S of the tread portion 2 (i.e., surface area of an imaginary tread in which whole sea area 8 is filled up). The land ratio Sb/S is preferably at least 15%, more preferably at least 17%, further preferably at least 18%, and is preferably at most 30%, more preferably at most 28%, further preferably at most 26%.

The height (maximum height) BH of block 9 is not particularly limited. However, if the height BH is too small, there is a tendency that sufficient traction or braking force is not obtained on unpaved road or rough terrain, and if the height BH is too large, very large bending moment acts on the root of the block 9 at the time of driving or braking, so the durability of the block 9 tends to deteriorate. From such points of view, it is preferable that the height BH of the block 9 (or the depth of the sea area 8) is at least 10.0 mm, especially at least 11.0 mm, and is at most 19.0 mm, especially at most 18.0 mm. In this embodiment, the height BHe measured at the tread edge $2e$ is in a range of from 70 to 130% the height BHc measured at the tire equator point Co.

The blocks pattern comprises a pair of rows of shoulder blocks 9E0 arranged circumferentially of the tire along each tread edge $2e$.

In this embodiment, the row of the shoulder blocks 9E0 comprises a first shoulder block 9E1 with an axially developing width W1 of the tread face 20 being small, and a second shoulder block 9E2 with the developing width W1 being large. In this embodiment, these first and second shoulder blocks 9E1 and 9E2 are arranged in alternately in the circumferential direction of the tire. In this first shoulder block 9E1, its area barycenter (centroid) of the tread face 20 is located closer to the tread edge $2e$ than that of the second shoulder block 9E2.

Figure 3:
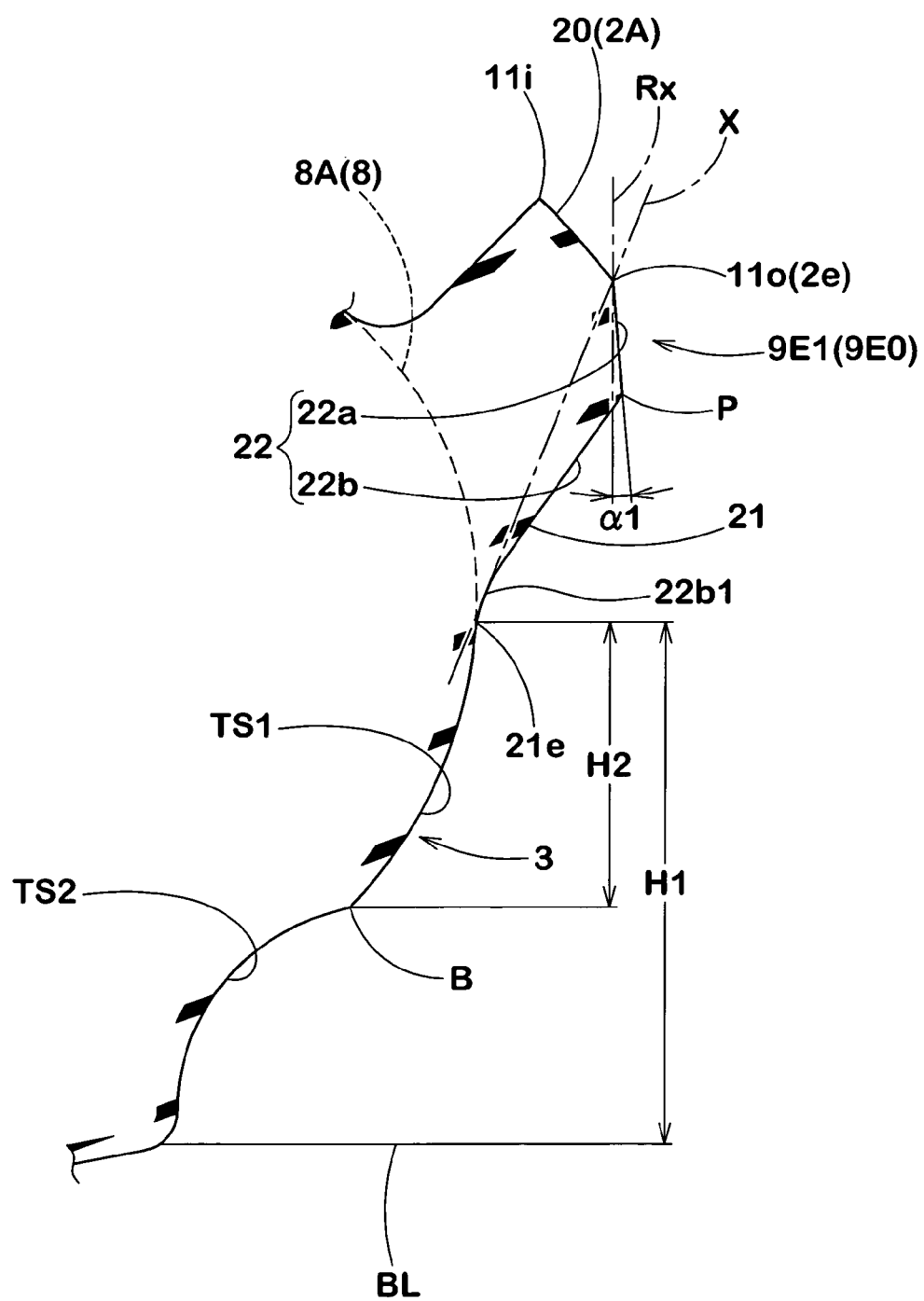
FIG. 3 is a sectional view showing a shoulder block, sidewall portion and the bead portion.

As shown in FIG. 3 in the enlarged scale, each shoulder block 9E1 includes the tread face 20 with an axially outer edge $11o$ corresponding to the tread edge $2e$, and a lateral face 21 extending from the tread edge $2e$ to its radially inner edge $21e$ located on the sidewall portion 3.

The lateral face 21 of at least one first shoulder block 9E1 is provided with a swelling portion 22. The swelling portion 22 swells axially outside of the tire than a reference line X which connects the tread edge $2e$ with the radially inner edge $21e$. As shown in FIG. 3, a reference symbol 8A represents a bottom of sea area 8, and the bottom substantially extends parallel with the tread profile 2A and smoothly connected to the outer profile TS1 of the sidewall portion 3.

In this embodiment, the swelling portion 22 has a triangular cross section which comprises a radially outer part $22a$ extending from the tread edge $2e$ with an angle of within plus-minus 20 degrees with respect to the radial direction (Rx) of the tire, and a radially inner part $22b$ extending from the radially inner end P of the outer part $22a$ to the radially inner edge $21e$ of the lateral face 21 while inclining inward of the tire axial direction. The inner part $22b$ is smoothly connected to the outer profile TS1 of the sidewall portion 3 through an arc joint $22b1$ having a center of curvature outside the tire. With this, the inner part $22b$ can prevent stress from being concentrated on a root of the first shoulder block 9E1.

As compared with the conventional off-road tire for motorcycle, the swelling portion 22 can reinforce the first shoulder block 9E1 in the block width direction without changing the position of the axially outer edge $11o$ of the tread face 20. Namely, the swelling portion 22 can enhance the strength of the block of the first shoulder block 9E1 without increasing the tread width. Accordingly, it is possible to provide the axially inner edge $11i$ of the tread face 20 of the first shoulder block 9E1 as outward as possible in the axial direction of the tire while keeping its strength.

Figure 5:
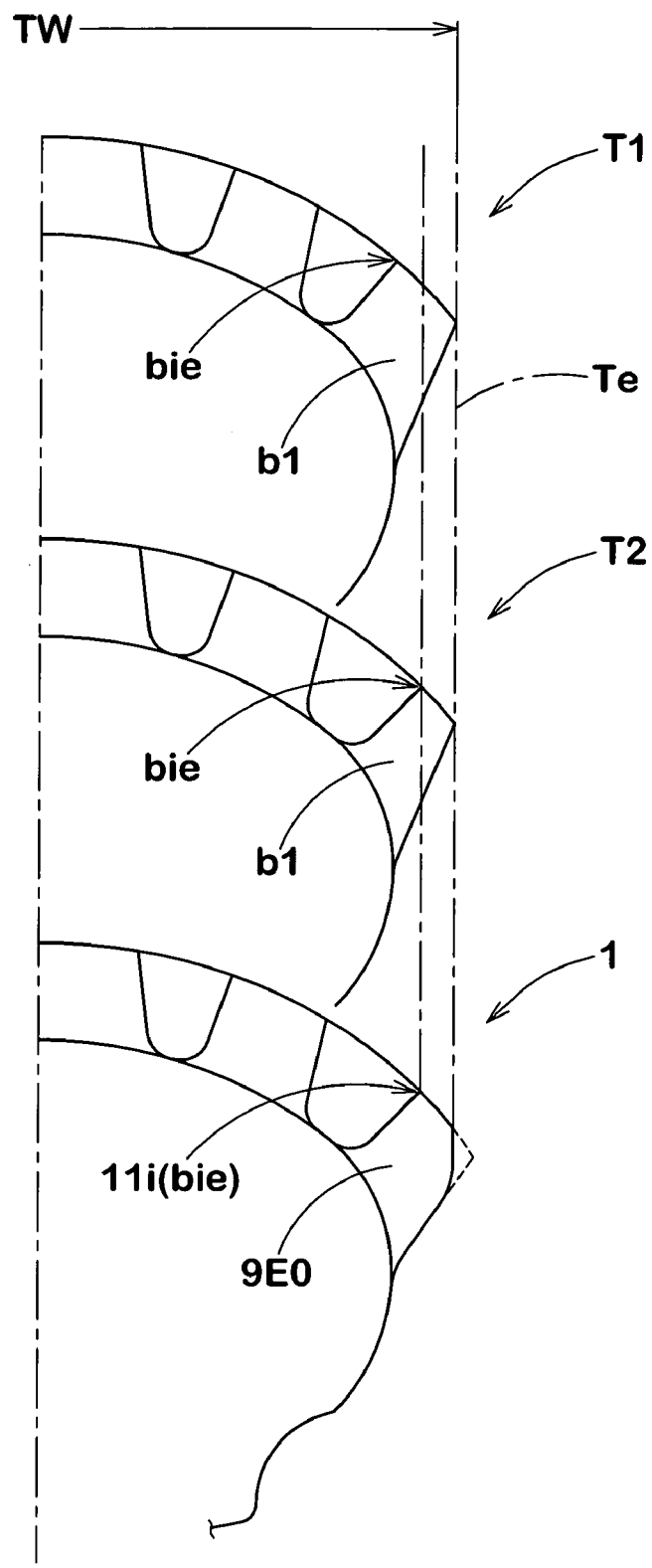
FIG. 5 is a diagram for explaining effect of the invention.

FIG. 5 shows three kinds of tires T1, T2 and 1 each with the same tread width TW. As shown in FIG. 5, when the block width of the shoulder block b1 is sufficiently secured and a necessary block strength is maintained as in the reference tire T1, the position of the axially inner edge (bie) of the shoulder block b1 tends to be provided inward of the axial direction of the tire. Thus, the lateral edge effect tends to reduce and the cornering performance is deteriorated. Also, when the block width is reduced and the position of the inner edge (bie) of the shoulder block b1 is provided axially outward as in the reference tire T2, the block strength is insufficient and the block becomes chipped or damaged. On the other hand, according to the tire 1 of the embodiment, the same block strength as that of the tire T1 is maintained, the same lateral grip performance as that of the tire T2 can be exhibited and the cornering performance can be enhanced.

Figure 4:
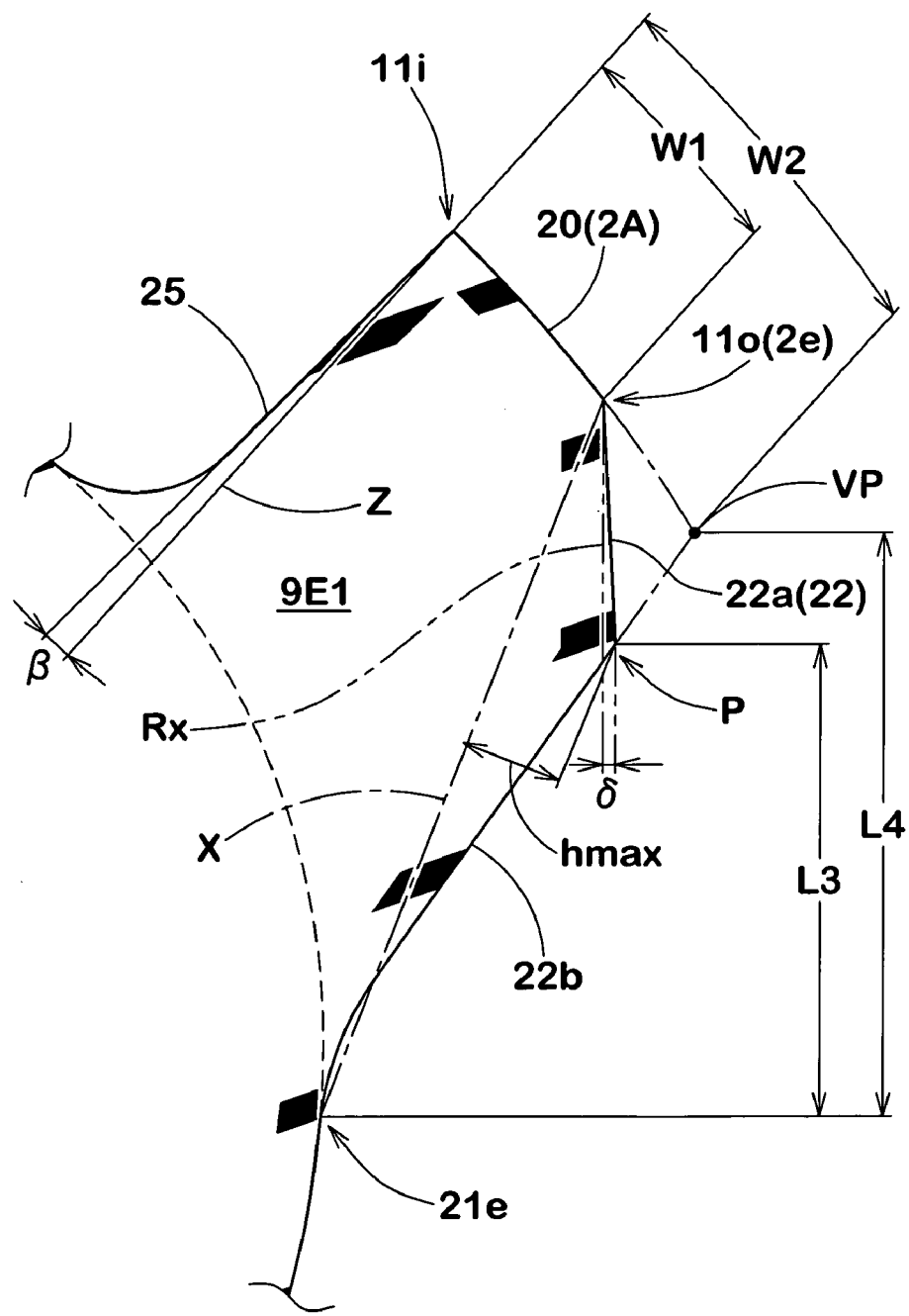
FIG. 4 is an enlarged sectional view of the shoulder block.

In order to further improve the effect of the invention, as shown in FIG. 4, it is preferable that the maximum swelling height (hmax) of the swelling portion 22 from the reference line x is in a range of 1.0 to 10.0 mm. If the maximum height (hmax) is less than 1.0 mm, the reinforcing effect is insufficient, and if the maximum height (hmax) exceeds 10.0 mm, the reinforcing effect is maxing out and its weight is unnecessarily increased. From such a viewpoint, it is preferable that the maximum height (hmax) is set to not less than 2.0 mm, and its upper limit is set to not more than 8.0 mm.

Preferably, the swelling portion 22 does not swell axially outward from the radial line Rx passing through the axially outer edge $11o$ by not less than 2.0 mm. If the swelling portion 22 swells from the radial line Rx not less than 2.0 mm, the off-road running performance is deteriorated, and there is a problem that the tire and the swing arm or the driving chain interfere with each other. Accordingly, it is preferable that the maximum swelling amount δ from the radial line Rx is not more than 1.0 mm, and more preferably that it does not swell from the radial line Rx.

In the first shoulder block 9E1, it is preferable that the developing width W1 of the tread face 20 in the axial direction of the tire is not more than 11.0 mm. With this, the position of the axially inner edge 11i of the tread face 20 is sufficiently provided outward in the axial direction of the tire, and the lateral grip performance is improved. At that time, the first shoulder block 9E1 preferably has an imaginary developing width W2 of not less than 11.0 mm which is measured from an axially inner edge 11i of the tread face 20 to an imaginary intersection point VP at which the extensions both of the tread face 20 and the inner part 22b of the swelling portion 22 intersect each other. This is because if the imaginary developing width W2 is not less than 11.0 mm, even when the developing width W1 is not more than 11.0 mm, necessary block strength can be secured.

To secure the block strength, it is preferable that the developing width W1 is not less than 40% of the imaginary developing width W2, and a radial height L3 between the radially inner edge 21e of the lateral face 21 and the lower end P of the outer part 22a is not less than 50% of a radial height L4 between the imaginary intersection point VP and the inner edge 21e of the lateral face 21. If these values are less than these ranges, it becomes difficult to secure the block strength.

Figure 6A:
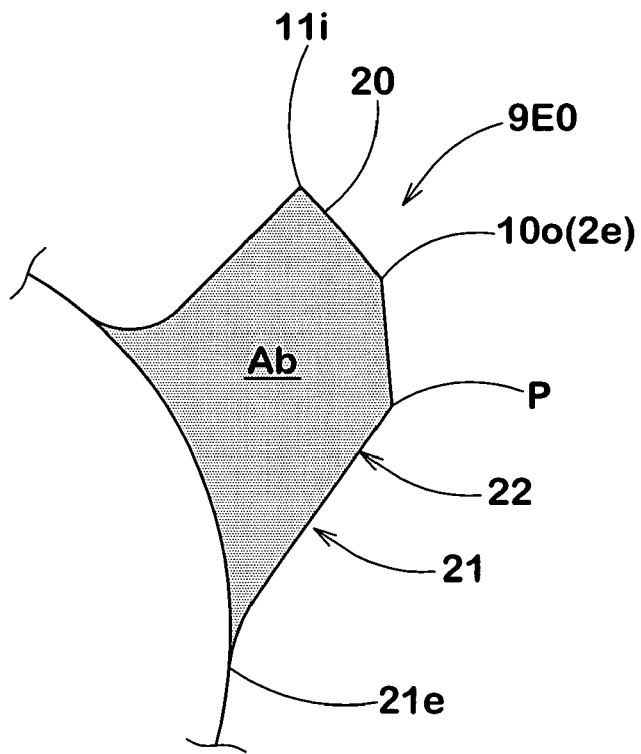
FIGS. 6a and 6b are enlarged sectional views of the shoulder block for explaining areas of the whole block and the swelling portion.
Figure 6B:
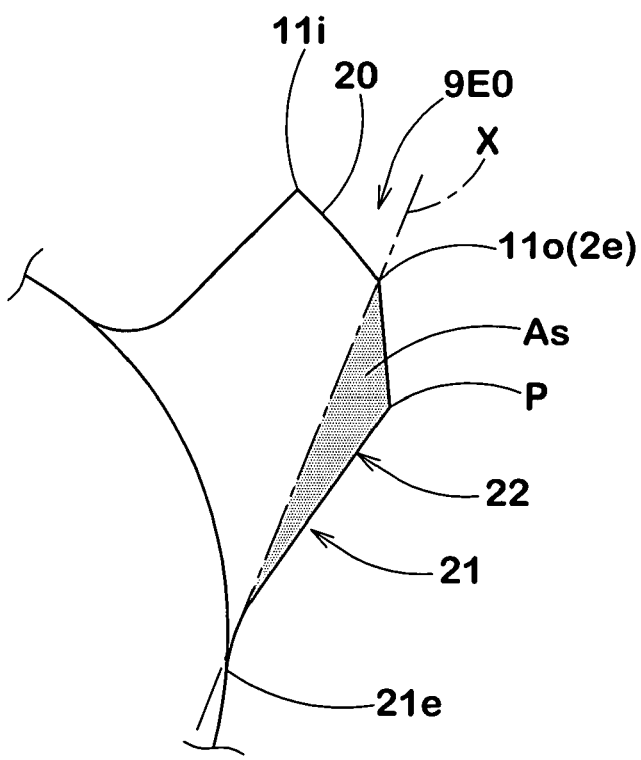
Figure 7:
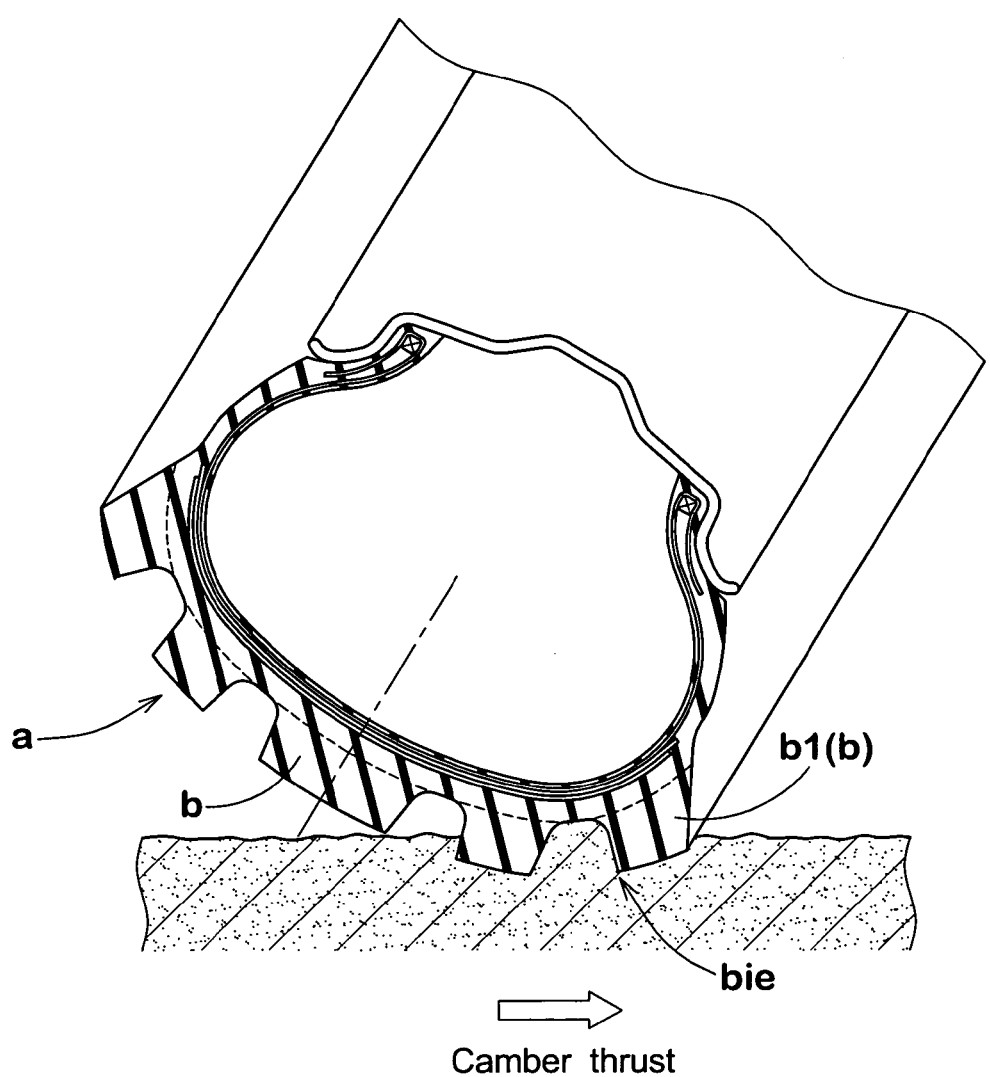
FIG. 7 is a sectional view of a conventional off-road tire for motorcycle.

Moreover, in order to improve the block strength effectively, it is preferable that the area (As) of the swelling portion 22 shown in FIG. 6b as a gray represents in the range of from 10 to 20%, more preferably 12 to 18% of the whole area (Ab) of the shoulder block shown in FIG. 6a as a gray.

According to the first shoulder block 9E1, the developing width W1 of the tread face 20 can be reduced. Therefore, the tread face 20 of the first shoulder block 9E is formed into a vertically long rectangular shape in which a ratio L1/W1 of the circumferentially developing length L1 (shown in FIG. 2) to the developing width W1 is in a range of from 1.0 to 4.0. By forming the tread face 20 into the thinner and longer rectangular shape as compared with the conventional technique, there is a merit that the edge can be made long which is effective for the lateral grip on off-road.

According to the first shoulder block 9E1, to secure a large biting amount into off-road and to exhibit high edge effect, at least the lateral inner face 25 of the shoulder block 9E is preferably inclined at angle beta of not more than 10 degrees with respect to a normal line z of the tread face 20 which passes through the axially inner edge 11i. The lower limit value of the angle beta is not less than −20 degrees in terms of the block rigidity and the block strength. In the angle beta, a direction of inclination in which the block is narrowed toward the tread face 20 is defined as + (positive), and a direction of inclination in which the block is widened is defined as − (negative). A plurality of slants having different angles beta may be connected to form the lateral inner face 25. In such a case, the angle beta of each slant is set in the above range.

Next, in the first shoulder block 9E1, the compression rigidity is enhanced by forming the swelling portion 22. Therefore, there is a tendency that the impact absorbing performance of the tire is reduced, and the riding comfort and the ground-contact performance are deteriorated. Hence, as shown in FIG. 3, in order to further increase the region of the soft sidewall portion 3, the radial height H1 of the radially inner edge 21e of the lateral face 21 from the bead base line BL is preferably set in a range of from 30 to 50% of the tire section height H0. With this, the reduction of the impact absorbing performance is suppressed, and the riding comfort and the ground-contact performance are maintained. If the ratio H1/H0 exceeds 50%, the radial height La of the tread profile 2A and the height BH of the blocks 9 which are necessary for cornering can not sufficiently be secured. Thus, it is preferable that the lower limit value of the ratio H1/H0 is not less than 35% and the upper limit value is not more than 45%.

The sidewall portion 3 has an outer profile TS1 which extends from the radially inner edge 21e of the lateral face 21 in the convex curved manner having a center of curvature inside the tire. The bead portion 4 has an outer profile TS2 which extends in the concave curved manner having a center of curvature outside the tire. A major part of the profile TS2 comes into contact with a rim flange when the tire is mounted on a standard rim. Since the profile TS1 of the sidewall portion 3 is curved in the convex manner, it is easily curved and has excellent impact absorbing performance. Therefore, the radial height H2 from the radially inner edge 21e of the lateral face 21 to a boundary B of the sidewall portion 3 and the bead portion 4 is preferably set in a range of from 15 to 40% of the tire section height H0. This is preferable because the deterioration in impact absorbing performance caused by the swelling portion 22 is suppressed, and the riding comfort and the ground-contact performance are maintained.

In this embodiment, the second shoulder block 9E2 is also provided with the swelling portion 22 on its lateral face 21 like the first shoulder block 9E1. If necessary, the second shoulder block 9E2 may be formed as a conventional shoulder block having no swelling portion 22. In such a case, it is preferable that the developing width W1 of the tread face 20 of the second shoulder block 9E2 is preferably set greater than 11.0 mm to secure the necessary block strength.

As shown in FIG. 2, the tread portion 2 is further provided with center blocks 9C1 and middle blocks 9C2, between the shoulder blocks 9E and 9E. In this embodiment, each center block 9C1 is disposed on the tire equator C, and each middle blocks 9C2 is disposed on both outer sides of the center blocks 9C1. Among them, since the middle block 9C2 is a block to which a load is applied not only at the time of straight-running but also at the time of cornering, block strength and block rigidity are required. In the tire 1 of the embodiment, since the developing width W1 of the tread face 20 of the first shoulder block 9E can be set low, a wide space can be secured between the center block 9C1 and the shoulder block 9E correspondingly, and if the middle block 9C2 is increased in size, the block strength and the block rigidity can be enhanced.

Although preferable embodiment of the present invention has been described in detail, the invention is not limited to the illustrated embodiment and the invention can be modified into various modes and can be carried out.

Comparison Test:

Off-road tire for motorcycle having the tire structure shown in FIG. 1, having a tread pattern shown in FIG. 2 as a basic pattern, and having tire size 120/80-19 63M were prototyped based on the specification shown in Table 1, the cornering performance, the block strength and the riding comfort of the tires were tested. Only shoulder blocks of these tires were different from each other, and other portions of the tires were substantially the same.

<Cornering Performance>

The prototyped tire was mounted on a rear wheel of a motorcycle for motocross having a piston displacement of 450 cc under the condition of a rim (19×2.15) and internal pressure (80 kPa), the motorcycle run on a motocross course by a professional test driver, the cornering performance at that time was evaluated based on the driver's feeling, and a result thereof was evaluated by a five-point method with index in which a reference 1 was defined as "3". The higher the index is, the more excellent the result is. A common tire (size of 90/100-21 57M, rim of 21×1.60, and internal pressure of 80 kPa) was used for the front wheel.

<Block Strength>

The block strength was evaluated based on whether the shoulder block became chipped after the vehicle run the motocross course based on the five-point method above.

<Riding Comfort>

The riding comfort was evaluated based on the driver's feeling after the running the motocross course. A result was evaluated by the five-point method with index in which the reference 1 is defined as "3". The higher the index is, the more excellent the result is.

a radially inner part extending from the radially inner end of the outer part to the radially inner edge of the lateral face while inclining inward of the tire axial direction.

4. The off-road motorcycle tire according to claim 3, wherein
the radially inner part of the swelling portion is smoothly connected to the sidewall portion through an arc having a center of curvature outside the tire.

5. The off-road motorcycle tire according to claim 3, wherein
the tread face of the shoulder block has an imaginary developing width of not less than 11.0 mm which is measured from an axially inner edge of the tread face to an imaginary intersection point at which the extensions both of

TABLE 1

|  | Ref. 1 | Ex. 1 | Ex. 2 | Ex. 3 | Ex. 4 | Ex. 5 | Ref. 2 | Ex. 6 | Ex. 7 | Ex. 8 |
|---|---|---|---|---|---|---|---|---|---|---|
| Developing width W1 <mm> of tread face | 8 | 8 | 8 | 8 | 8 | 8 | 8 | 8 | 8 | 8 |
| Vertical/lateral ratio L1/W1 | 2.0 | 2.0 | 1.0 | 4.0 | 2.0 | 2.0 | 2.0 | 2.0 | 2.0 | 2.0 |
| Presence or absence of swelling portion | Absence | Presence | Presence | Presence | Presence | Presence | Presence | Presence | Presence | Presence |
| Swelling height hmax <mm> | — | 2.2 | 2.2 | 2.2 | 0.8 | 6.0 | 2.2 | 2.2 | 2.2 | 2.2 |
| Ratio W1/W2 of developing width | 1.0 | 0.56 | 0.56 | 0.56 | 0.85 | 0.31 | 0.68 | 0.76 | 0.56 | 0.56 |
| Height ratio H1/H0 | 0.38 | 0.38 | 0.38 | 0.38 | 0.38 | 0.38 | 0.25 | 0.5 | 0.38 | 0.38 |
| Height ratio H2/H0 | 0.22 | 0.22 | 0.22 | 0.22 | 0.22 | 0.22 | 0.09 | 0.34 | 0.22 | 0.22 |
| Swelling amount δ <mm> | — | 0 | 0 | 0 | 0 | 0 | 0 | 0 | 0.5 | 1.0 |
| Lb <mm> | 97 | 97 | 97 | 97 | 97 | 97 | 97 | 97 | 97 | 97 |
| BHe <mm> | 12.5 | 12.5 | 12.5 | 12.5 | 12.5 | 12.5 | 12.5 | 12.5 | 12.5 | 12.5 |
| Cornering performance | 3.0 | 4.0 | 3.0 | 4.5 | 3.0 | 2.8 | 2.8 | 2.8 | 3.5 | 2.8 |
| Block strength | 3.0 | 4.0 | 3.2 | 3.0 | 3.1 | 4.5 | 4.5 | 2.8 | 4.2 | 4.5 |
| Riding comfort | 3.0 | 3.0 | 3.0 | 3.0 | 3.0 | 3.0 | 2.8 | 3.5 | 3.0 | 3.0 |

The invention claimed is:

1. An off-road motorcycle tire comprising
a tread portion provided with a plurality of blocks including an axially outmost shoulder block,
a pair of sidewall portions, and
a pair of bead portions,
the shoulder block comprising
a tread face having an axially outer edge corresponding to a tread edge and
a lateral face extending from the tread edge to a radially inner edge located on the sidewall portion,
the lateral face having a swelling portion swelling axially outside of the tire than a reference line which connects the tread edge and the radially inner edge, in a cross section including a tire axis,
the swelling portion swelling at most 2.0 mm from a radial line passing through the tread edge, and
the radial height of the radially inner edge of the lateral face from the bead base line being in a range of from 30 to 50% of the tire section height.

2. The off-road motorcycle tire according to claim 1, wherein
a maximum swelling height of the swelling portion from the reference line is in a range of from 1.0 to 10.0 mm.

3. The off-road motorcycle tire according to claim 1, wherein
the swelling portion has a triangular cross section comprising
a radially outer part extending from the tread edge and having an angle within plus-minus 20 degrees with respect to the radial direction of the tire, and the tread face and the radially inner part of the swelling portion intersect each other.

6. The off-road motorcycle tire according to claim 3, wherein a radial height between the radially inner edge of the lateral face and the radially inner end of the outer part is not less than 50% of a radial height between the radially inner edge of the lateral face and an imaginary intersection point at which extensions of both the tread face and the inner part of the swelling portion intersect each other.

7. The off-road motorcycle tire according to claim 1, wherein
the tread face of the shoulder block has a developing width of not more than 11.0 mm.

8. The off-road motorcycle tire according to claim 1, wherein
the tread face of the shoulder block has a ratio L1/W1 of the circumferentially developing length L1 and the developing width W1 being in a range of from 1.0 to 4.0.

9. The off-road motorcycle tire according to claim 1, wherein
the sidewall portion has an outer profile which extends in the convex curved manner having a center of curvature inside the tire,
the bead portion has an outer profile which extends in the concave curved manner having a center of curvature outside the tire, and
the radial height from the radially inner edge of the lateral face to a boundary of the sidewall portion and the bead portion is in a range of from 15 to 40% of the tire section height.

10. The off-road motorcycle tire according to claim 2, wherein the swelling portion swells at most 2.0 mm from a radial line passing through the tread edge.

11. The off-road motorcycle tire according to claim 1, wherein the tread edge is located axially outward of the sidewall portion.

12. The off-road motorcycle tire according to claim 1, wherein a tread width between the tread edges is the maximum tire section width.

13. The off-road motorcycle tire according to claim 1, wherein the swelling portion swells a distance of 0 to 2.0 mm from the radial line.

14. The off-road motorcycle tire according to claim 1, wherein the radial height of the radially inner edge of the lateral face from the bead base line is from 35 to 50% of the tire section height.

* * * * *